June 16, 1959     L. E. MORRIS     2,890,696
ANESTHESIA APPARATUS
Original Filed Oct. 30, 1953     2 Sheets-Sheet 1
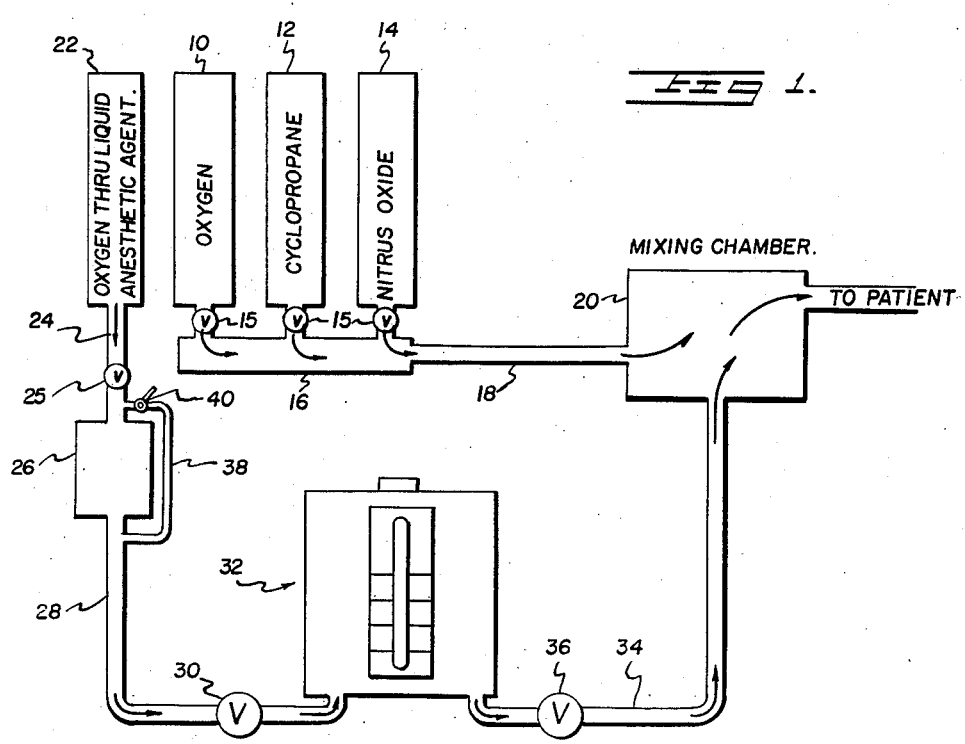
Fig. 1.
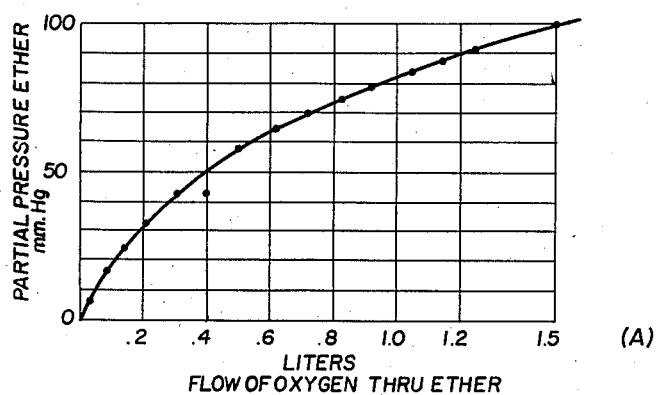
Fig. 2.
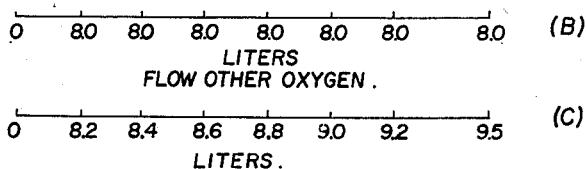
INVENTOR
LUCIEN E. MORRIS
BY *Jewett, Mead, Browne & Schuyler*
ATTORNEY June 16, 1959 — L. E. MORRIS — 2,890,696
ANESTHESIA APPARATUS
Original Filed Oct. 30, 1953 — 2 Sheets-Sheet 2

INVENTOR
LUCIEN E. MORRIS
BY
ATTORNEY

United States Patent Office 2,890,696
Patented June 16, 1959

2,890,696

ANESTHESIA APPARATUS

Lucien E. Morris, Seattle, Wash.

Continuation of application Serial No. 389,259, October 30, 1953. This application December 17, 1957, Serial No. 703,347

8 Claims. (Cl. 128—188)

This invention relates to anesthesia apparatus and methods and more particularly to methods and apparatus for vaporizing a liquid anesthetic and for mixing a vaporized liquid anesthetic with other gases and controlling the concentration of the vaporized liquid anesthetic in said mixture. This application is a continuation of my pending application Serial No. 389,259, filed October 30, 1953, and now abandoned.

The known techniques and apparatus for the vaporization of an anesthetic, such as ether, which is normally in a liquid state at room temperature, generally involve passing all or a predetermined portion of the total flow of the anesthetic gases used in conjunction with the liquid anesthetic over or through the liquid anesthetic which is to be vaporized. In apparatus operating on this principle, a control valve or key on the container for the liquid anesthetic is adjusted to control the proportion of the total flow of anesthetic gases which passes through or above the liquid anesthetic to thereby promote vaporization of the liquid anesthetic. The liquid anesthetic when vaporized joins in the main stream of gases flowing to the patient.

Anesthetic techniques and apparatus of the type just mentioned have several undesirable characteristics. For example, they do not provide accurate and precise control over the mixing of the vaporized anesthetic with other anesthetic agents, and furthermore changes in concentration of the vaporized anesthetic are quite likely to be sudden, gross and irritant and contribute to difficulty in providing smooth anesthesia. The lack of delicate and sure control which is characteristic of most known apparatus and methods employing vaporized anesthetics causes danger of inadvertent relative overdosage of chloroform, for example, and also frequently results in irritant effects due to sudden exposure to high concentrations of ether, for example.

Accordingly, it is an object of this invention to provide an apparatus and method for accurately controlling the rate of vaporization of a liquid anesthetic such as ether.

It is another object of the invention to provide an apparatus and method for providing a vernier control of the rate of vaporization of a liquid anesthetic and of the concentration of the vaporized anesthetic in a mixture of gaseous anesthetics.

It is still another object of this invention to provide an apparatus and method for providing an accurately controlled mixture of gases for anesthetic purposes in which one of the gases of the mixture is the vapor of a substance which is normally in liquid state at room temperature.

Still another object of the invention is to provide a vaporizing apparatus and method which provides rapid and efficient vaporization of a liquid into the gaseous state, such as the vaporization of liquid ether into the gaseous state.

In achievement of these objectives, this invention provides an apparatus and method in accordance with which a highly accurate control of the rate of vaporization of a substance from liquid to gaseous state is obtained by passing a metered flow of a gas such as oxygen through the liquid substance to be vaporized. The mixture of oxygen and the vaporized substance then pass to a mixing chamber where at least one other gas is added to the mixture, the resulting mixture of gases then passing to the point of utilization.

More specifically, the invention provides an apparatus and method in which a metered flow of oxygen is passed through a vaporizing device containing an anesthetic in liquid state, such as liquid ether, which vaporizes due to the flow of oxygen through the liquid and also due to heat transfer from the ambient atmosphere. The rate of vaporization of the ether is a known function of the rate of flow of oxygen, and hence, by suitable adjustment of the oxygen flow, the vaporization of the ether may be accurately controlled. The mixture of oxygen and ether vapor then passes to a mixing chamber where it is mixed with gases such as oxygen, cyclopropane or nitrous oxide. The resulting mixture of gases then passes to the patient being anesthetized.

An important feature of the invention is the provision of a sintered metal member through which the oxygen passes to be dispersed in the liquid anesthetic. The passage of the oxygen through the sintered member causes the oxygen to be broken up into a great number of small bubbles which greatly increases the surface area at the gas-liquid interface and thus promotes the efficient vaporization of the liquid ether.

Other objects and advantages of the present invention will become more apparent from the following detailed description taken in conjunction with the attached drawings in which:

Fig. 1 is a diagrammatic representation of an anesthesia apparatus for vaporizing and mixing accurately controlled quantities of a liquid anesthetic with gaseous anesthetics in accordance with the invention;

Fig. 2 is a graph showing the partial pressure of ether as a function of the flow of oxygen through ether;

Figure 3:
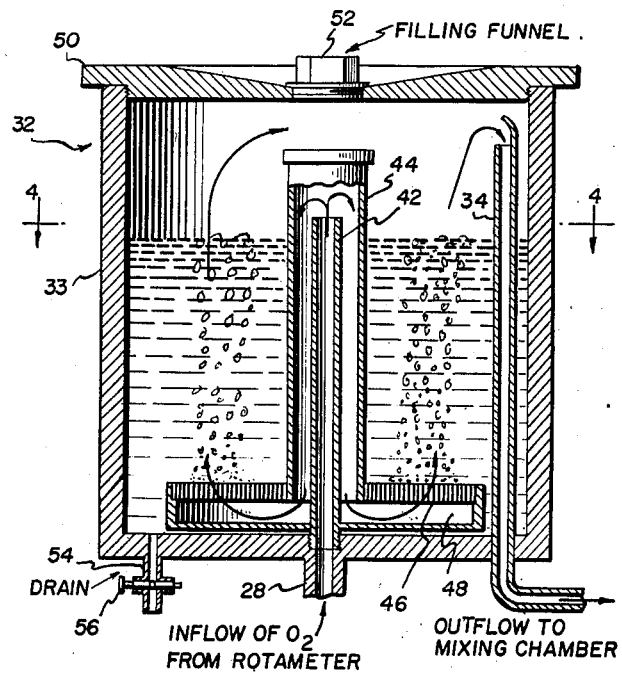
Fig. 3 is a view in sectional elevation of a vaporizing apparatus in accordance with the invention.
Figure 4:
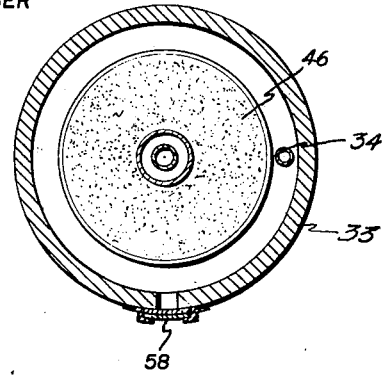
Fig. 4 is a view in section along the line 4—4 of Fig. 3.

Referring now to the drawings and more particularly to Fig. 1, there is shown an apparatus in which tanks 10, 12 and 14, which respectively contain oxygen, cyclopropane and nitrous oxide, are connected in parallel with each other through separate valves and meters 15 to a manifold 16. The manifold 16 in turn is connected by a conduit 18 to a mixing chamber 20. Another conduit 21 connects the output of mixing chamber 20 to a patient's breathing circuit which, since it may be any suitable type known to those skilled in the art, is indicated generally by the block 23. A separate supply tank 22 of oxygen is connected by a conduit 24 in series with a control valve 25 to a metering device 26 which indicates the rate of flow of the oxygen from tank 22. The rate of oxygen flow from tank 22 to the metering device 26 is controlled by the valve 25, which may be adjusted to give any desired reading on the metering device. The metering device 26 in turn is connected through a conduit 28 in series with a valve 30 to a vaporizing device generally indicated at 32, which will be described more fully hereinafter. The outlet of the vaporizing device is connected by a conduit 34 in series with a valve 36 to the mixing chamber 20. The valves 30 and 36 on either side of the vaporizing device 32 permit excluding the vaporizer from the system in case of an emergency, or if for any other reason it should be desired to disconnect the vaporizer from the system.

The metering device 26 may be of any suitable type which provides a highly accurate indication of rate of flow such as, for example, a metering device of the type described in any of the following references:

R. R. Macintosh, and W. W. Mushin: "Physics for the Anesthetist," page 148–155, published by C. C. Thomas in 1947.

Richard Foregger: "The Rotameter in Anesthesia." Anesthesiology 7, pages 549–557 (September) 1946.

Theory of the Flowrator, Catalog, Section 98–A, pages 9808–9, 9816–8, copyright 1947, published by Fischer & Porter Co., Hatboro, Pennsylvania.

A by-pass 38 is provided around metering device 26 and includes a suitable control device 40 which is actuated to throw the by-pass into parallel with the metering device when large or coarse flows of oxygen are being delivered from tank 22. Metering device 26 includes suitable scale means, indicated generally by reference numeral 41, for reading rate of flow and the scale means is changeable so that a different scale is used for reading rate of flow when oxygen flows through the by-pass. Scale means 41 is automatically changed from fine to coarse by operating control device 40 to throw in the by-pass, the broken line 43 indicating that control device 40 and scale means 41 are connected with respect to each other so that the scale means is automatically changed from fine to coarse when the by-pass is thrown into parallel with the metering device.

In accordance with the invention, the rate of flow of the oxygen from source 22 is adjusted by means of valve 25 until the metering device 26 indicates that the desired rate of flow of oxygen is passing through the liquid anesthetic to be vaporized. As will be seen in the graph of Fig. 2 a direct relation exists between the rate of flow of oxygen through the liquid ether and the partial pressure of the ether, which, in turn, is proportional to the volumetric quantity of the vaporized ether. In other words, by adjusting the rate of flow of the oxygen through the liquid anesthetic which is to be vaporized, such as ether, a variable volume of vapor is obtained from the liquid anesthetic.

The graph of Fig. 2 is a reproduction of test data indicating ethyl ether concentrations in an oxygen atmosphere as measured with the aid of a Beckman oxygen analyzer. In this test, the only gas admitted to manifold 16 was oxygen from tank 12, a constant flow of 8.0 liters per minute being maintained, as indicated on Scale B. At the same time, the rate of flow of oxygen from tank 22 through the liquid ether in the vaporizer was varied from 0–1.5 liters per minute, as indicated on Scale A. The curve plotted on the graph indicates in millimeters of mercury the partial pressure of the ether in the final mixture corresponding to the changing rate of flow of the oxygen through the ether. It can be seen that a direct relation exists between the partial pressure of the ether vapor in the final mixture and the rate of flow of oxygen through the ether. The total flow of gas, as indicated on Scale C, is the sum of the readings of Scales A and B, but does not take into account the volume occupied by the ether vapor itself.

The vaporizing device 32 shown in Fig. 3 comprises a generally cylindrical container 33 which is made of copper or some other metal having comparable heat-transfer characteristics. The container 33 is mounted on top of an anesthesia table. The heat necessary for vaporization of the liquid agent, such as ether, is supplied from the heat reservoir present in the mass of copper of the container and in the table top on which the container is mounted. The metal of copper container and table top in turn receive heat from the ambient atmosphere.

The conduit 28 is connected to the bottom of the container 32 and communicates with a re-entrant flow path comprising a tubular inlet pipe 42 open at both ends, which extends vertically above the connection of the inlet passage 28 into the interior container 32, and an outer tubular member 44 closed at its upper end and open at its lower end and coaxially positioned with respect to the inner tubular member 42.

A disc-shaped plate 46 of sintered material is positioned coaxially around the bottom of the outer tubular member 44 and forms the cover of a cylindrical cup-like member 48 which is closed on its sides and bottom to provide a trap or chamber for liquid anesthetic. The sintered plate 46 is preferably made of the porous bronze material commercially known as "Porex," produced by the Moraine Products Division of General Motors Corporation, and having a composition which is 90–94% copper and the remainder tin. The porosity of the sintered member 46 is such that a gas such as oxygen will pass through the member with only slight resistance and emerge as a multitude of fine bubbles in the liquid anesthetic agent. The thermal conductivity of the sintered member 46 is such as to provide rapid conduction of heat to the gas-liquid interface where vaporization is taking place. The member 48 is preferably made of copper or some other material of high thermal conductivity.

The container 32 is provided with a cover member 50 which is in screw-threaded engagement with the upper end of the container. The upper surface of cover member 50 slopes downwardly toward the center and is provided with a plug member 52 which is in screw-threaded engagement with a centrally disposed aperture in the cover member. When the plug member 52 is removed, the interior space of the container may be filled to a desired level with the liquid anesthetic such as ether. A drain outlet 54 is provided at the lower end of the container and a valve means 56 may be opened to permit flow of liquid through the drain when desired. A suitable fluid level indicating device 58 is positioned on the exterior of the container 32 and communicates with the interior of the container to provide a suitable indication of the liquid level in the container. Outlet pipe or conduit 34 extends upwardly through the interior of the container 32 with its open upper end positioned above the normal level of the liquid anesthetic within the container 32.

It can be seen that oxygen which is admitted through the conduit 28 to the lower end of the container 32 passes vertically upwardly through the inner tubular member 42 and out of the upper open end of the tubular member 42 into the space between the outer surface of member 42 and the inner surface of member 44. The oxygen then passes downwardly through this space, as indicated by the directional arrows, and passes down into the interior of the closed cup or trap 48 which is covered by the sintered plate 46. The oxygen then passes upwardly through the pores of the sintered material and is broken into literally millions of small bubbles which contact the liquid anesthetic. These bubbles of oxygen pass upwardly through the liquid anesthetic which is to be vaporized, the small size of the bubbles greatly increasing the interface between the liquid and gaseous mediums and thereby greatly increasing the efficiency of the vaporization of the liquid ether.

The oxygen and the vaporized ether mixed or entrained therewith pass into the open upper end of the outlet conduit 34 which is positioned above the surface of the liquid. The oxygen and ether vapor then pass through conduit 34 to the mixing chamber 20 where they mix with the main stream of gases flowing directly from manifold 16, the mixture of gases and vaporized ether then passing from the mixing chamber 20 to the patient.

Figure 5:
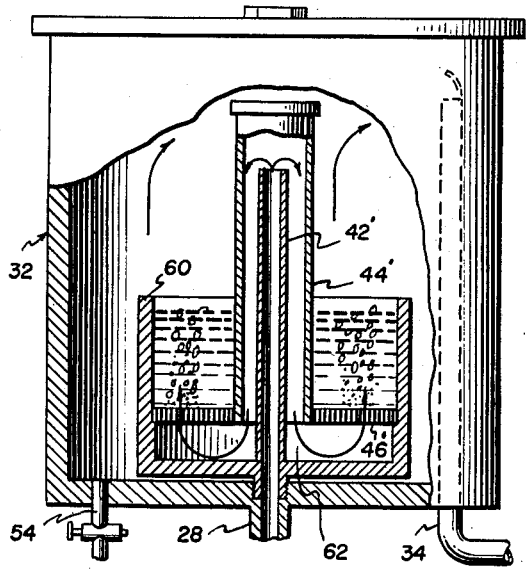
Fig. 5 is a front elevation view, partially cut away, of a modified form of vaporizing device in accordance with the invention.

There is shown in Fig. 5 a modified form of vaporizing device which is adapted to vaporize small quantities of the order of magnitude of 30 cc., for example, of a liquid anesthetic such as chloroform or trilene when it is desired to use these anesthetics instead of ether. The same outer container 32 is used as in the case of the embodiment of Fig. 3, with the same inlet connection 28, drain 54 and outlet pipe 34 as previously described.

A re-entrant flow arrangement similar to that described in connection with Fig. 3 is provided, comprising the inner tubular member 42' which is open at both its upper end and lower end and outer tubular member 44' which is closed at its upper end but open at its lower end. A plate of sintered material 46' surrounds the lower end of the outer tubular member 44' and is supported by the cylindrical wall of cup member 60 intermediate of the height of the cup member. In the embodiment of Fig. 5, the outer diameter of both the plate 46' and of the cup 60 are smaller than the diameters of the comparable members 46 and 48 of the embodiment of Fig. 3. Furthermore, the outer wall of the cylindrical-shaped cup extends upwardly a substantial distance above the level of the sintered plate 46', the space within the cup above the level of the upper surface of the plate 46' serving as a receptacle for the liquid anesthetic, such as chloroform or trilene, which is to be vaporized. A chamber 62 is formed between the bottom surface of the cup 60 and the lower surface of the sintered plate 46'.

It can be seen that oxygen which passes upwardly through the inlet 28 and through the inner tubular member 42' passes into the space between the outer surface of inner tubular member 42' and the inner surface of the outer tubular member 44'. The oxygen then passes downwardly into the trap or chamber 62 and thence upwardly through the pores of the sintered plate 46'. As in the case of the embodiment of Fig. 3, the oxygen is broken into a great multitude of small bubbles which pass upwardly through the liquid anesthetic in the space above the sintered plate 46'. The oxygen and the vaporized anesthetic, such as chloroform or trichlorethylene, then pass into the open upper end of the outlet conduit 34 and thence to the mixing chamber 20, where the vaporized anesthetic and the oxygen are mixed with the gases flowing directly from the manifold 16.

It will be noted that in both the embodiments of Figs. 3 and 5, the sintered plate, the cup which supports the sintered plate, and the inner and outer tubular members of the re-entrant flow arrangement are all removable as a unit from the vaporizing chamber 32. In both the embodiments of Figs. 3 and 5, the inner tubular member 42 or 42' projects beneath the lower end of the cup member and is in screw-threaded engagement with the bottom portion of the container 32. Alternatively, the sintered plate could be sealed to the side walls of container 32 adjacent the bottom of the container, suitable external trap means or the like being provided.

In using the apparatus and practicing the method according to the above-described embodiments of the invention, the rate of flow of oxygen from the tank 22 is adjusted by means of the valve 25 until the metering device 26 indicates the proper rate of flow of oxygen to obtain the desired rate of vaporization of the liquid anesthetic. When the oxygen is being passed through liquid ether, for example, the rate of flow of oxygen may be adjusted in accordance with the relationship indicated by the graph of Fig. 2 to give in the final mixture the desired partial pressure of ether, which is a function of the volume of vaporized ether. The oxygen bubbles up through the liquid anesthetic as previously described and causes vaporization of the anesthetic, the oxygen and vaporized anesthetic then passing from the vaporizing device 32 to the mixing chamber 20. The selected gases from any of the tanks 10, 12 or 14 are combined with the vaporized anesthetic and oxygen in the mixing chamber 20 and the mixture of gases then passes from the mixing chamber 20 to the patient.

The apparatus and methods of the invention provide a vernier control of the concentration of the vaporized anesthetic. Thus, for example, if there is a 10 liter per minute flow of "other gases" and at one moment there is mixed with the other gases a flow of 100 cc./min. of oxygen containing saturated ether vapor, and at a later moment there is mixed with the other gases a flow of 1000 cc./min. oxygen containing saturated ether vapor, it is obvious that in the second flow (1 liter/min.) the concentration of ether will be ten times as great as in the case of the first flow, with an infinite number of gradations in between, assuming that there is a direct linear relation between the flow of vaporized anesthetic and the flow of oxygen through the liquid anesthetic.

Using the apparatus and methods of the invention, the increase in vapor concentration delivered to the patient may be gradual and steadily progressive in proportion to the amount of oxygen metered through the liquid anesthetic and in inverse relation to the total flow of other gases. Furthermore, the construction of the vaporizing unit, embodying the sintered material to cause bubbling of the oxygen, and the use of materials having a high thermal conductivity, promotes efficient and rapid vaporization of the liquid anesthetic.

The apparatus and methods of the invention provide an increased delicacy and sureness of control as compared to other anesthesia apparatus and methods. This reduces the danger of inadvertent relative overdosage of chloroform, and avoids the irritant effects of sudden exposure to high concentration of ether. With the apparatus and methods of the present invention an induction with ether-oxygen becomes nearly as pleasant as one with nitrous oxide-oxygen and very nearly as rapid. The metered flow of oxygen through the liquid anesthetic in effect reflects the addition of increments of anesthetic vapor as though it were itself being metered as a separate gas.

While I have described and illustrated embodiments of the invention, I wish it to be understood that I do not intend to be restricted solely thereto but that I intend to cover all modifications thereof which would be apparent to one skilled in the art and which come within the spirit and scope of my invention.

What I clam as my invention is:

1. An apparatus for producing an anesthesia mixture consisting of vaporized liquid anesthetic, a carrier gas, and another anesthetic gas, said apparatus comprising a source of said other anesthetic gas, said source having a valve and a meter operatively associated therewith, a mixing chamber, a passage means connecting said other anesthetic gas source to said mixing chamber whereby said other anesthetic gas flows through said passage means to said mixing chamber, the valve and meter operatively associated with said other gas source being interposed between said other gas source and said passage means; a separate carrier gas circuit including, in series, a carrier gas source, carrier gas metering and measuring means, a liquid anesthetic vaporizer, a valve means, and means connecting the output of said vaporizer to said mixing chamber to mix said carrier gas and the vaporized liquid anesthetic carried thereby with said other gas whereby said other gas acts as a diluent gas to the anesthetic vapor introduced from said carrier gas circuit, said vaporizer being interposed in said carrier gas circuit so that all of the metered and measured carrier gas passes through said vaporizer, and said valve means being interposed between said vaporizer and said mixing chamber and being operable to cut off the flow of metered and measured carrier gas and anesthetic vapor from said vaporizer to said mixing chamber whereby anesthetic vapor may be excluded completely from said passage means and said mixing chamber and thus be prevented from being delivered to the patient; a patient's breathing circuit, and means connecting the output of said mixing chamber to said patient's breathing circuit.

2. An apparatus according to claim 1, wherein there is a plurality of said other gas sources, there being a separate source for each of said other gases and each separate source having a valve and a meter operatively associated therewith, the passage means being common to all of said other gas sources and connecting each of said other gas sources to said mixing chamber whereby all of said other gases flow through said passage means to said mixing chamber, and the valve and meter operatively associated with each of said other gas sources being interposed between the source with which it is associated and said common passage means.

3. For use with an anesthetic apparatus having, in series, a diluent gas source, diluent gas valve and meter means, diluent gas passage means, a mixing chamber, and a patient's breathing circuit; a separate carrier gas circuit including, in series, a carrier gas source, carrier gas metering and measuring means, a liquid anesthetic vaporizer, a valve means, and means connectible between said valve means and a mixing chamber to deliver said carrier gas and the vaporized liquid anesthetic carried thereby to said mixing chamber to mix said carrier gas and the vaporized liquid anesthetic carried thereby with a diluent gas to produce an anesthetic mixture suitable for delivery to a patient's breathing circuit, said vaporizer being interposed in said carrier gas circuit so that all of the metered and measured carrier gas passes through said vaporizer, and said valve means being interposed between said vaporizer and the means connectible to said mixing chamber and being operable to cut off the flow of metered and measured carrier gas and anesthetic vapor from said vaporizer to said means connectible to said mixing chamber whereby anesthetic vapor may be excluded completely from said means connectible to said mixing chamber and thus be prevented from being delivered to a patient's breathing circuit.

4. An apparatus for producing an anesthesia mixture consisting of vaporized liquid anesthetic, a carrier gas, and a diluent gas, and whereby the concentration of vaporized liquid anesthetic in said mixture is precisely controllable, said apparatus comprising a diluent gas circuit including, in series, a diluent gas source, diluent gas metering means, and a mixing chamber; a separate carrier gas circuit including, in series, a carrier gas source, a carrier gas metering and measuring means including a selectively operable by-pass for obtaining an increased flow of said carrier gas through said metering and measuring means, a liquid anesthetic vaporizer, said vaporizer being interposed in said carrier gas circuit so that all of the metered and measured carrier gas passes through said vaporizer, and means connecting the output of said vaporizer to said mixing chamber to mix said carrier gas and the vaporized liquid anesthetic carried thereby with said diluent gas; a patient's breathing circuit, and means connecting the output of said mixing chamber to said patient's breathing circuit whereby said anesthesia mixture may be delivered to said patient's breathing circuit.

5. An apparatus for producing an anesthesia mixture consisting of vaporized liquid anesthetic, a carrier gas, and a diluent gas, and whereby the concentration of vaporized liquid anesthetic in said mixture is precisely controllable, said apparatus comprising a diluent gas circuit including, in series, a diluent gas source, diluent gas metering means, and a mixing chamber; a separate carrier gas circuit including, in series, a carrier gas source, a carrier gas metering and measuring means including a selectively operable by-pass for obtaining an increased flow of said carrier gas through said metering and measuring means, changeable scale means, means to operate said by-pass, and means connecting said by-pass operating means to said scale means to change said scale means in response to operation of said by-pass operating means, a liquid anesthetic vaporizer, said vaporizer being interposed in said carrier gas circuit so that all of the metered and measured carrier gas passes through said vaporizer, and means connecting the output of said vaporizer to said mixing chamber to mix said carrier gas and the vaporized liquid anesthetic carried thereby with said diluent gas; a patient's breathing circuit, and means connecting the output of said mixing chamber to said patient's breathing circuit whereby said anesthesia mixture may be delivered to said patient's breathing circuit.

6. An apparatus for producing an anesthesia mixture consisting of vaporized liquid anesthetic, a carrier gas, and a diluent gas, and whereby the concentration of vaporized liquid anesthetic in said mixture may be controlled precisely, said apparatus comprising a diluent gas circuit including, in series, a diluent gas source, diluent gas metering means, and a mixing chamber; and a separate carrier gas circuit including, in series, a carrier gas source, carrier gas metering and measuring means, a liquid anesthetic vaporizer including a body of porous sintered material having a multitude of fine pores therein and a thermal conductivity substantially the same as that of copper, said porous body being interposed in said carrier gas circuit so that all of said carrier gas passes through said porous body and is dispersed as a multitude of fine bubbles in liquid anesthetic contained in said vaporizer, and means connecting the output of said vaporizer to said mixing chamber to mix said carrier gas and the vaporized liquid anesthetic carried thereby with said diluent gas to produce an anesthesia mixture suitable for delivery to a patient and wherein the concentration of anesthetic vapor in said mixture is in direct proportion to the amount of carrier gas metered through said liquid anesthetic and is in inverse proportion to the total flow of said diluent gas.

7. An apparatus for producing an anesthesia mixture consisting of vaporized liquid anesthetic, a carrier gas, and diluent gases, and whereby the concentration of vaporized liquid anesthetic in said mixture may be controlled precisely, said apparatus comprising a diluent gas circuit including a plurality of diluent gas sources each having a metering means, a mixing chamber, and means connecting all of said diluent gas sources to said mixing chamber, the metering means of each diluent gas source being interposed between the diluent gas source with which it is associated and said mixing chamber; and a separate carrier gas circuit including, in series, a carrier gas source, carrier gas metering and measuring means, a liquid anesthetic vaporizer including a body of porous sintered material having a multitude of fine pores therein and a thermal conductivity substantially the same as that of copper, said porous body being interposed in said carrier gas circuit so that all of said carrier gas passes through said porous body and is dispersed as a multitude of fine bubbles in liquid anesthetic contained in said vaporizer, and means connecting the output of said vaporizer to said mixing chamber to mix said carrier gas and the vaporized liquid anesthetic carried thereby with said diluent gases to produce an anesthesia mixture suitable for delivery to a patient and wherein the concentration of anesthetic vapor in said mixture is in direct proportion to the amount of carrier gas metered through said liquid anesthetic and in inverse proportion to the total flow of said diluent gases.

8. For use with an anesthetic apparatus having, in series, a diluent gas source, diluent gas metering means, a mixing chamber, and a patient's breathing circuit; a separate carrier gas circuit including, in series, a carrier gas source, carrier gas metering and measuring means, a liquid anesthetic vaporizer including a body of porous sintered material having a multitude of fine pores therein and a thermal conductivity substantially the same as that of copper, said porous body being interposed in said carrier gas circuit so that all of the metered and measured carrier gas passes through said porous body and is dispersed as a multitude of fine bubbles in liquid anesthetic contained in said vaporizer, and means connectible between the output of said vaporizer and a mixing chamber to deliver said carrier gas and the vaporized liquid anesthetic carried thereby to said mixing chamber to mix said carrier gas and the vaporized liquid anesthetic carried thereby with a diluent gas to produce an anesthesia mixture suitable for delivery to a patient's breathing circuit and wherein the concentration of anesthetic vapor in said mixture is in direct proportion to the amount of carrier gas metered through said liquid anesthetic and in inverse proportion to the total flow of said diluent gas.

References Cited in the file of this patent

UNITED STATES PATENTS

| | | |
|---|---|---|
| 1,778,716 | Foregger | Oct. 21, 1930 |
| 2,038,451 | Schatteneck | Apr. 21, 1936 |
| 2,518,746 | Blohm | Aug. 15, 1950 |
| 2,584,450 | Holt | Feb. 5, 1952 |

UNITED STATES PATENT OFFICE
Certificate of Correction

Patent No. 2,890,696

June 16, 1959

Lucien E. Morris

It is hereby certified that error appears in the above numbered patent requiring correction and that the said Letters Patent should read as corrected below.

In the drawing, Sheet 1, Figure 1 should appear as shown below instead of as in the patent:

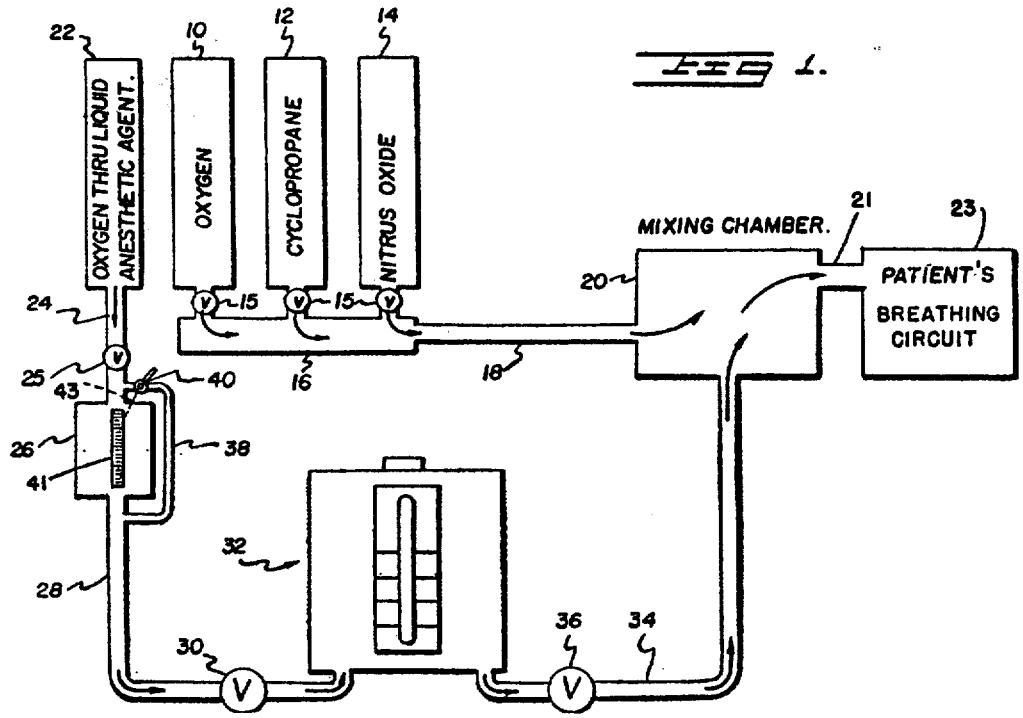

Signed and sealed this 10th day of May 1960.

[SEAL]

Attest:
KARL H. AXLINE,
*Attesting Officer.*

ROBERT C. WATSON,
*Commissioner of Patents.*